Figure 5:
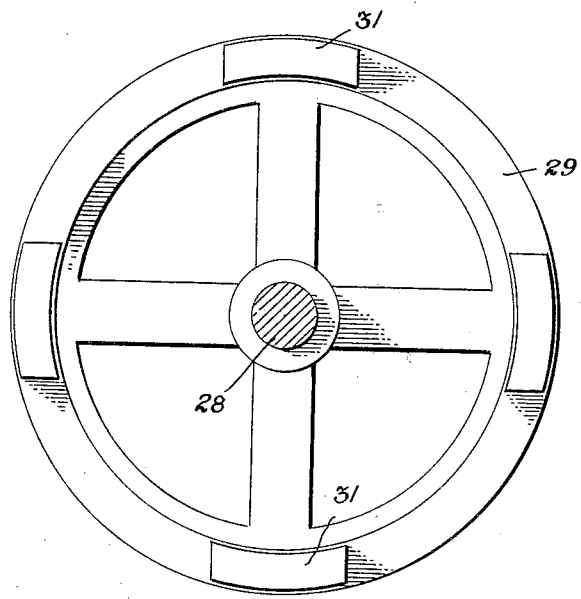

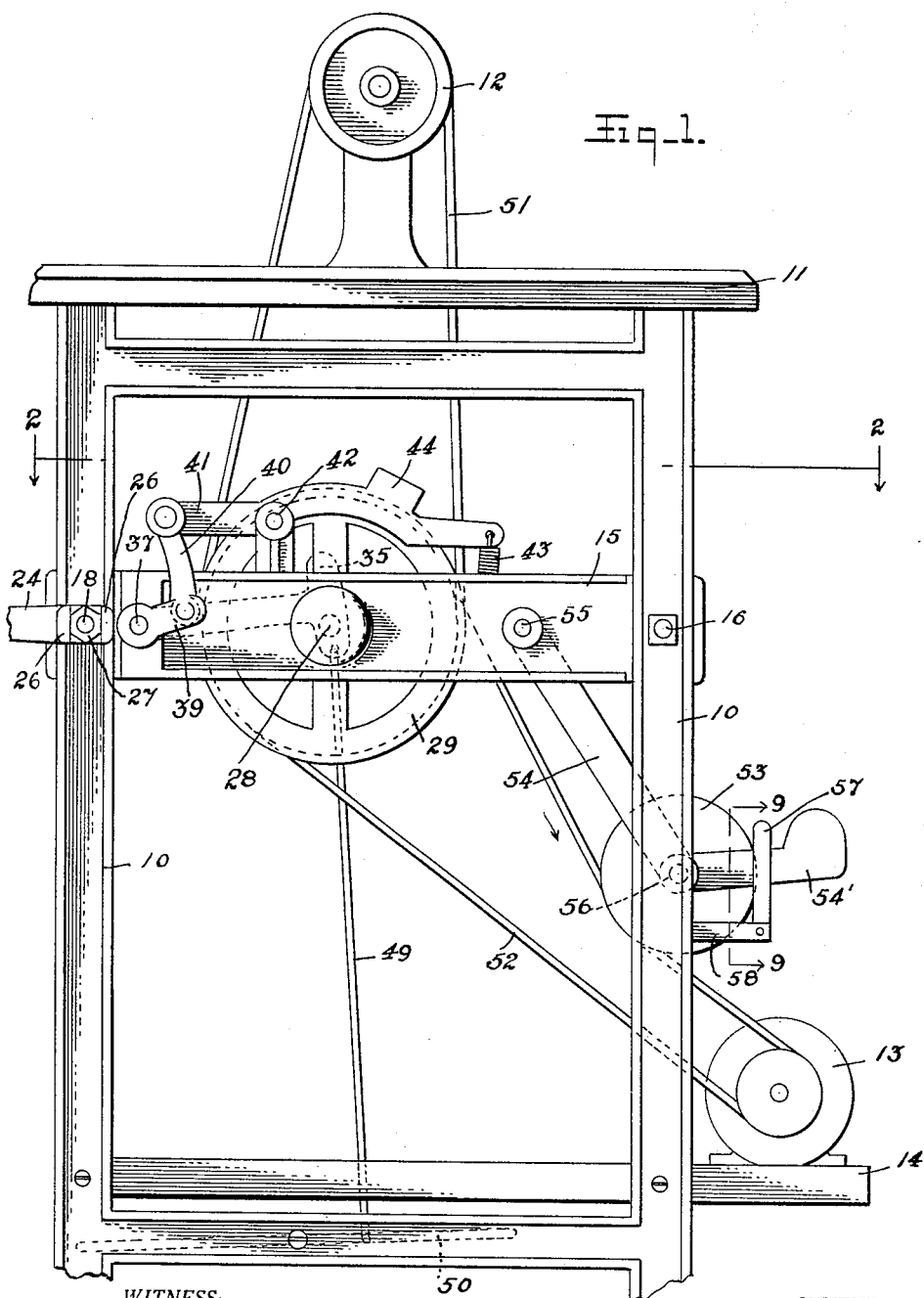

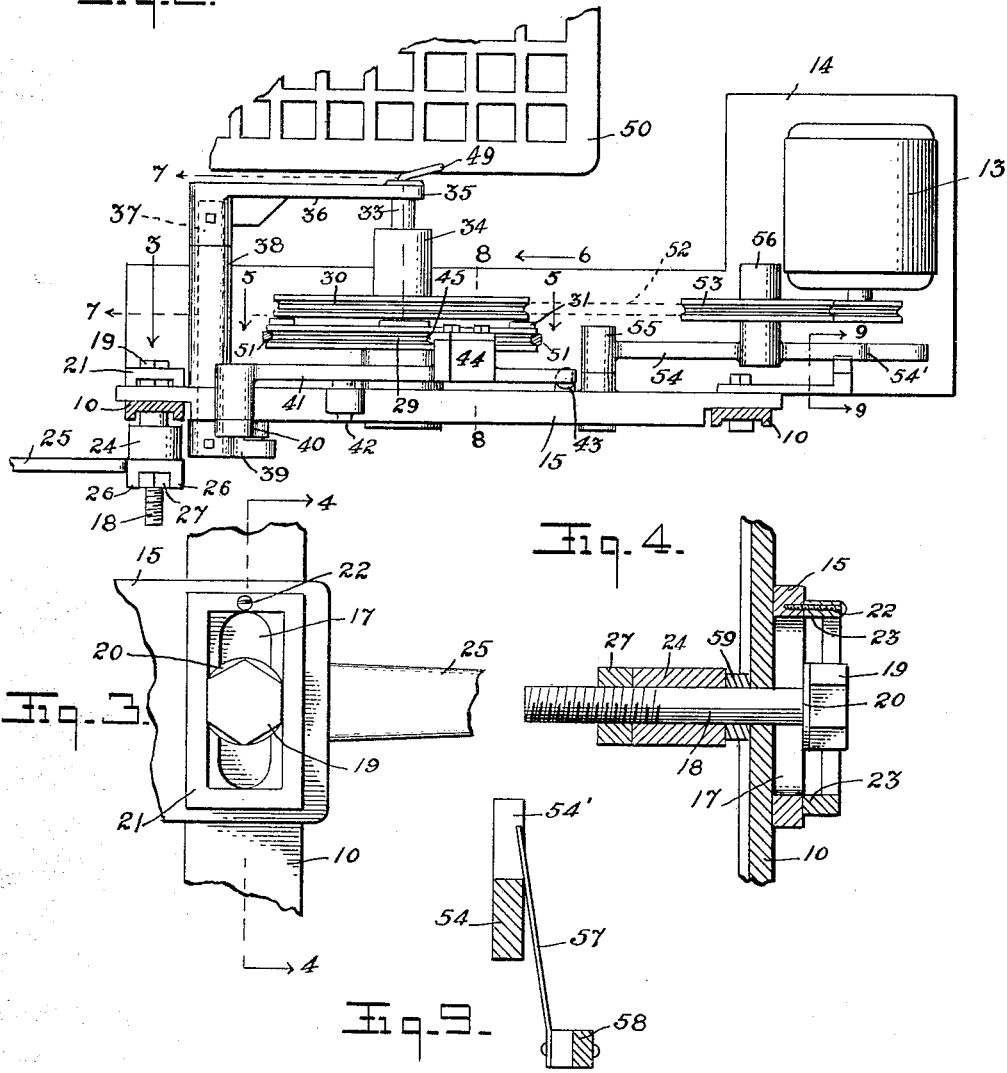

Jan. 10, 1933.  N. KRAWITZ  1,893,501
POWER TRANSMISSION MECHANISM
Filed May 12, 1930   3 Sheets-Sheet 3

WITNESS:

INVENTOR
Nathan Krawitz.
BY
HIS ATTORNEY

Patented Jan. 10, 1933

1,893,501

UNITED STATES PATENT OFFICE

NATHAN KRAWITZ, OF PHILADELPHIA, PENNSYLVANIA

POWER TRANSMISSION MECHANISM

Application filed May 12, 1930. Serial No. 451,586.

This invention relates to power transmission mechanisms with a special, though not exclusive, object of driving a sewing machine of the usual power driven type.

A further object of the invention is to provide improved means for tensioning the driving belt of the machine to provide exactly the desired degree of tension depending upon the nature of the work without adding to the frictional resistance of the machine by overtightening the belt or losing power and speed by a belt too loose for the work.

A further object of the invention is to provide improved means for taking up the slack in the belt or band of a sewing machine or like device when it stretches from use.

A further object of the invention is to provide a belt tightener in the form of an idler adapted to apply the greater amount of tightening stress at the instant of starting and to release some of the tightening stress after the machine has been started and momentum acquired.

A further object of the invention is to provide improved structural features for carrying forward the several objects above stated.

The invention therefore comprises in combination with a power unit and machine of an intermediate structure to which a belt or band extends from the power unit and from which it extends to the machine, with improved means for varying the position of the intermediate unit for the purpose of applying variable stress to the belts or bands.

This invention is directed to other objects and possesses other features of novelty and advantage, some of which, together with the foregoing, will be hereinafter more fully set forth.

In the drawings:—

Figure 8:
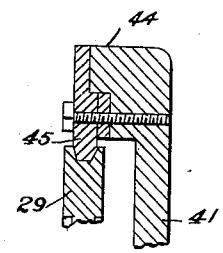
Figure 6:
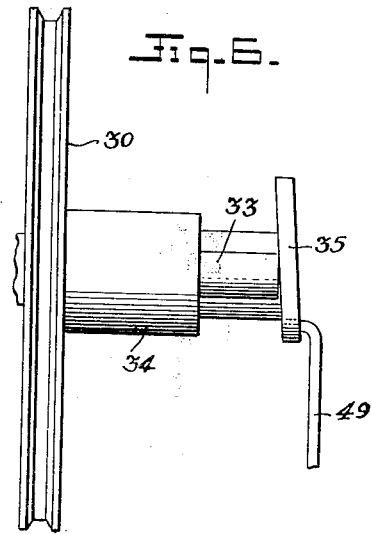
Figure 7:
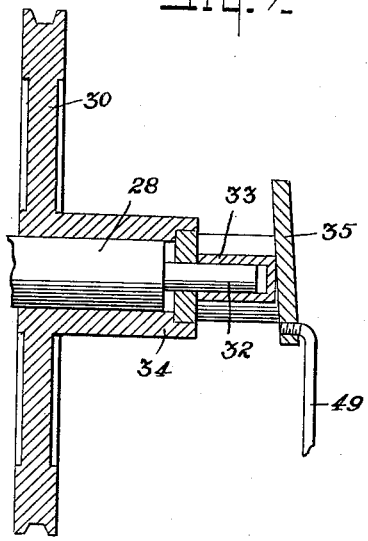

Figure 1 is a view in end elevation of a machine to which the power transmission is applied representing conventionally a sewing machine, Figure 2 is a top plan view of the power transmitting units showing some of the frame work in section taken on line 2—2 of Figure 1, Figure 3 is a detail sectional view of the clamping mechanism as indicated by arrow 3 at Figure 2, Figure 4 is a sectional view through the clamping mechanism taken on line 4—4 of Figure 3, Figure 5 is a sectional view through the shaft and showing the brake and clutch wheel in side elevation as indicated by line 5—5 of Figure 2, Figure 6 is a view of the band wheel and operating cam seen in side elevation as indicated by arrow 6 at Figure 2, Figure 7 is a view through the band wheel taken on line 7—7 of Figure 2, Figure 8 is a sectional view through the brake taken on line 8—8 of Figure 2, and Figure 9 is a sectional view through the belt tightener and its resistance taken on line 9—9 of Figures 1 and 2.

Like characters of reference indicate corresponding parts throughout the several views.

As seen at the present time, the greatest field of utility of the present invention will probably be for driving power sewing machines and the invention is therefore illustrated in combination with such a machine indicated by the legs 10, table 11, and pulley 12, the latter representing conventionally, a sewing machine head. It is to be understood that while this invention is particularly applicable to the driving of sewing machines, it is in no way limited thereto and may be employed in any situation and for driving any mechanism found desirable.

At some location about the frame, a motor 13 is mounted, here shown as on an extension 14, it being understood however, that the showing of the motor is only an indication of a power element and it might also represent a line shaft or other source of power and might be located as circumstance and engineering might indicate.

Extending transversely between the legs 10, is a bar 15 pivoted at one end at 16 to one leg and made slidable at the opposite end by means of a slot 17 formed in the end of the bar. This slot 17 embraces a bolt 18, which said bolt also extends through one of the legs 10, as shown in Figures 1, 2 and 3. Between the head of the bolt 19 and the leg 10, a washer 20 is interposed and a keeper 21 is pivoted at 22 to the bar 15, and a slot therein properly proportioned to engage the sides of the head 19 and prevent its turning and is provided with spacers 23 to accommodate the washer 20 so that while the keeper 21 holds the head against turning, it does not interfere with the application of clamping stress to the bar 15 by the bearing of the washer 20 upon the bar and clamped by said head.

Upon the side of the leg opposite the bar 15, the bolt is embraced by a sleeve 21 having a handle 25 thereon and provided with spaced abutments 26 between which a nut 27 is carried and turned on the bolt 18 by the manual oscillation of the lever 25. This means is employed for tightening the bar 15 against the leg 10.

The bar 15 is provided with a shaft 28 upon which is mounted, one of the clutch wheels 29, the other clutch wheel 30, being also mounted upon said shaft and slidable thereon longitudinally. As will be seen from Figure 5, the clutch wheel 29 is provided with a plurality of friction members 31 against which the clutch wheel 30 engages in the manner which will be hereinafter more fully explained.

At its extremity, the shaft 28 is preferably reduced in size as indicated at 32 and thereon is mounted a sleeve 33 bearing against the end of the hub 34 of the wheel 30. A cam 35 is provided to bear against this sleeve 33 by being mounted upon a lever 36 carried upon the shaft 37. The shaft 37, as will be seen more particularly in Figure 2, extends through the bearing sleeve 38 and through the bar 15, of which the bearing sleeve 38 is preferably an integral part and upon the opposite side of the bar is provided a crank arm 39. The crank arm 39 is connected by a link 40 with the lever 41, fulcrumed at 42. The lever 42, at its end opposite the link 40 is connected with a spring 43. The lever 41 also carries an offset 44 to which is attached a friction member 45 engaging in the band groove of the clutch wheel 29. A detail of this is shown at Figure 8. The spring 43 therefore tends to hold this brake member 45 in braking engagement with the clutch wheel 29, but is released therefrom by the downward movement of the lever 36 carrying the cam 35.

This is manually actuated in any approved manner as by a rod 49 to a foot treadle. The oscillation of the treadle 50 therefore simultaneously raises and releases the brake 45 from engagement with the clutch wheel 29 and forces the sleeve 33 against the hub 34 of the clutch wheel 30 thereby forcing the clutch wheel 30 into engagement with the friction members 31 of the clutch wheel 29.

From the peripheral groove of this clutch wheel 29, a band 51 runs to the machine to be driven indicated conventionally as the sewing machine head 12.

Between the power unit 13 and the clutch wheel 30, a band or belt 52 is employed as indicated more particularly at Figure 1. To maintain this band 52 at sufficient tension for properly starting the mechanism, an idler 53 is employed carried upon an arm 54 fulcrumed at 55 to the bar 15. The arm 54 preferably extends outwardly at somewhat of an angle from the journal 56 of the idler and as indicated at 54' carries a weight which may be variable to apply the necessary stress to the band 52. To prevent vibration of this idler tightener, a spring 57 is carried by an arm 58 attached to the leg 10 and bears against the extension 54' as shown at Figures 1 and 9.

In operation, when by reason of use or any other cause the band 51 has become loosened, it is again tightened by loosening the nut 27 upon the bolt 18 and manually moving the bar 15 downwardly upon its pivot 16 and accommodated by the slot 17 therein. When the necessary tension has been applied to the band, the nut 27 is again tightened to hold this tension and the tension may be varied as the work varies, some work requiring a greater amount of tension upon the band than other work.

When the band has stretched to an unusable length, a section is cut out in the usual manner, the bar and instrumentalities carried thereby being moved to compensate for the shortening of the band.

The arm 25 which actuates the nut 27, is adapted to be varied in its tightened position. This is brought about by rotating the arm to unscrew the nut until it will escape the lugs 26, then sliding the sleeve back to free the nut from the lug, turning the nut a part of a revolution as may be required again engaging the nut between the lugs 26 and by rotation restoring it to clamping position. Preferably a collar or sleeve 59 will be interposed between the sleeve 24 and the leg 10, such arrangement being shown at Figures 2 and 4.

It will also be noted that when the bar 15 is lowered for the purpose of tightening the belt 51, it would naturally loosen the belt 52 by lowering with the bar 15 the clutch wheel 29. To compensate for this loosening, the idler 53 is carried upon an arm 54 which itself is pivoted to the bar 15 so that when the bar is lowered, the idler is also lowered to exert a greater degree of stress.

The parts being arranged and associated as shown, and the motor being driven at a relatively constant speed, pressure applied to the treadle 50 will be transmitted through the rod 49 to the cam 35, which will through the mechanism above described, lift the brake 45 from the clutch wheel 29 and simultaneously move the clutch wheel 30 into clutching engagement with the friction members 31 of the clutch wheel 29. The motor being already in motion and the clutch wheel 30 being constantly driven, the movement of this clutch wheel into clutching engagement with the clutch wheel 29 will start the mechanism, indicated conventionally at 12, instantly at full speed.

The release of the treadle 50 will, through the action of the spring 43, instantly return the brake 45 to braking position to stop the machine instantly, such action also releasing the engagement between the clutch wheels 29 and 30.

When the motor 13 is driving the clutch wheel 30 without load, the idler 53 will assume the position shown at Figure 1, tightening the belt 52 to such position that it will respond immediately to the application of load thereto. As the load is applied however, the curve in the belt 52, which is moving in the direction indicated by the arrow, will be straightened out and the idler 53 raised. To prevent oscillation or vibration of this idler, the spring 57 is employed which, while not sufficient to prevent the idler from acting in a belt tightening capacity, is sufficiently resistant to prevent the vibration or "shimmying" of the idler. The greatest resistance is of course, overcoming the inertia of rest, hence the application of the belt tightening function of the idler must be greater at the instant of starting the machine than is necessary after the machine has acquired momentum. The device is arranged as shown for the purpose of applying the necessary frictional tension at the instant of starting and automatically releasing the stress after starting to relieve friction.

Of course, the power transmission mechanism may be modified in various ways without departing from the invention herein set forth and hereinafter claimed.

The invention is hereby claimed as follows:—

1. The combination with a frame embodying a pair of spaced uprights, a prime mover associated with the frame, a power consuming device associated with the frame, a bar fulcrumed upon one of said uprights, and extending into sliding engagement with the other of said uprights, manual means to clamp the bar relative to said last mentioned upright and in elected position, a band for said power consuming device, a belt from said prime mover and interacting pulleys carried by said bar for the band and belt respectively.

2. The combination with a frame embodying a pair of spaced uprights, a bar fulcrumed upon one upright and extending into sliding engagement with the other upright, a pair of pulleys concentrically juxtaposed upon the bar, a prime mover mounted upon the frame, a power consuming device mounted upon the frame and spaced from the prime mover, a belt extending from the prime mover to one of said pulleys, a band extending from the other said pulley to the power consuming device, a shaft journaled upon the bar parallel to the axes of the pulleys, an arm carried by said shaft and provided with a brake engaging the periphery of one of said pulleys, a cam extending from said shaft and adapted to move the other pulley upon its journal into frictional engagement with its companion pulley, manual means for rocking the shaft for simultaneously actuating the cam and brake, and manual means for positioning the bar in band tensioning position.

3. The combination with a prime mover and a power consuming device, a bar fulcrumed intermediate the prime mover and the consuming device, a power transmitting organization mounted upon the bar, comprising concentrically journaled juxtaposed wheels, said wheels being provided with clutch members upon their proximate faces, a brake, manual means for simultaneously releasing the brake and interengaging the clutch members and a belt tightening idler all carried by the bar, means to oscillate the bar for adjusting the wheels relative to the consuming device, and means at the free end of the bar tending to hold the bar at attained positions.

4. The combination with a prime mover and a power consuming device, a fulcrumed bar, a power transmitting organization mounted upon the bar embodying concentrically juxtaposed wheels, a band extending from one of said wheels to the power consuming device, a belt from the other of said wheels of the prime mover, said wheels being provided with proximate clutch faces, a brake, manual means for moving the wheels into clutching engagement and simultaneously releasing the brake, means to oscillate the bar for tensioning the band, and a belt tightening idler all carried by the bar, and means at the free end to lock the bar at an attained adjustment.

5. The combination with a prime mover and a power consuming device, a manually adjustable bar removably interposed between the prime mover and the power consuming device, a power transmitting organization carried by the bar comprising a pair of pulleys, manual means for interconnecting the pulleys for coaction, a band extending from one of said pulleys to the power consuming device, a belt extending from the other of said pulleys to the prime mover, a fulcrumed arm, a weighted idler journaled upon the arm and bearing upon the belt, and a friction member bearing against the arm adapted to retard oscillation of the arm all carried by the bar, and means at the free end to lock the bar and said carried organization at an attained adjustment.

6. The combination with a prime mover and a power consuming device, a bar fulcrumed intermediate the prime mover and the consuming device, a power transmitting organization mounted upon the bar comprising a pair of journaled pulleys, a brake for one of said pulleys, a band extending from said last mentioned pulley to the power consuming device, a belt from the other of said pulleys to the prime mover, a fulcrumed arm, a weighted idler carried by the arm and bearing upon the belt, a friction member engaging the arm tending to retard vibration, manual means for interconnecting the pulleys and simultaneously releasing the brake, all carried by the bar, means to facilitate the oscillation of the bar for tensioning the band, and means at the free end to lock the bar at an attained tensioning adjustment.

In testimony whereof I have signed my name to this specification.

NATHAN KRAWITZ.